United States Patent
Kim et al.

(10) Patent No.: US 8,343,672 B2
(45) Date of Patent: Jan. 1, 2013

(54) CATALYST COATED ELECTROLYTE MEMBRANE, FUEL CELL INCLUDING THE SAME, METHOD OF PREPARING THE CATALYST COATED ELECTROLYTE MEMBRANE

(75) Inventors: Ji-rae Kim, Seoul (KR); Seung-jae Lee, Seongnam-si (KR); Hyuk Chang, Seongnam-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1907 days.

(21) Appl. No.: 11/444,473

(22) Filed: Jun. 1, 2006

(65) Prior Publication Data

US 2007/0184331 A1      Aug. 9, 2007

(30) Foreign Application Priority Data

Feb. 8, 2006     (KR) .................... 2006-12030

(51) Int. Cl.
H01M 8/06 (2006.01)
H01M 8/24 (2006.01)
H01M 8/10 (2006.01)

(52) U.S. Cl. ........ 429/416; 429/462; 429/474; 429/479; 429/483; 429/493; 429/494

(58) Field of Classification Search .................. None
See application file for complete search history.

(56) References Cited

U.S. PATENT DOCUMENTS

| | | | |
|---|---|---|---|
| 5,547,911 A | 8/1996 | Grot | 502/101 |
| 6,391,486 B1 | 5/2002 | Narayanan et al. | 429/40 |
| 7,091,149 B2 * | 8/2006 | Iwasaki et al. | 502/101 |
| 7,595,123 B2 * | 9/2009 | Sone et al. | 429/428 |
| 2002/0136940 A1 | 9/2002 | Mao et al. | 429/30 |
| 2003/0078157 A1 * | 4/2003 | Matsuoka et al. | 502/101 |
| 2006/0057281 A1 * | 3/2006 | Izumi et al. | 427/115 |
| 2007/0122667 A1 * | 5/2007 | Kelley | 429/19 |

FOREIGN PATENT DOCUMENTS

| | | |
|---|---|---|
| CN | 1560949 | 1/2005 |
| JP | 10-507305 | 7/1998 |
| JP | 2003-132899 | 5/2003 |
| WO | WO 2005/001966 | 1/2005 |

OTHER PUBLICATIONS

Office Action issued by the Chinese Patent Office in Chinese Patent Application No. 2006100842185 on Apr. 11, 2008.
Japanese Office Action issued Nov. 17, 2009 in corresponding Japanese Patent Application No. 2006-155443.
Certificate of Patent No. ZL200610084218 issued in the corresponding Chinese application on Mar. 17, 2010 (including the Chinese application CN100594629C).

* cited by examiner

*Primary Examiner* — Camie Thompson
(74) *Attorney, Agent, or Firm* — Lee & Morse, P.C.

(57) ABSTRACT

A catalyst coated electrolyte membrane including an anode catalyst layer and a cathode catalyst layer at opposite sides thereof, respectively, wherein micro cracks of the anode catalyst layer or cathode catalyst layer occupy 0.01-1 area % of the total area of the respective anode catalyst layer or cathode catalyst layer, a fuel cell including the same, and a method of preparing the catalyst coated electrolyte membrane. In the catalyst coated electrolyte membrane, micro cracks of the cathode catalyst layer or the anode catalyst layer can be minimized and thus the resistance between the electrode catalyst layer and an electrolyte membrane can be minimized, and crossover of a fuel, such as methanol, ethanol, other alcohols, methane, etc., to a cathode electrode can be minimized, and thus the catalyst coated electrolyte membrane has improved performance and durability.

31 Claims, 5 Drawing Sheets

PERFORMANCE: 75mW/cm²
DURABILITY : 1~2% (DECREASE RATE OF
PERFORMANCE FOR 15 DAYS)

PERFORMANCE: 52mW/cm²
DURABILITY : 10% (DECREASE RATE OF
PERFORMANCE FOR 10 DAYS)

CATALYST COATED ELECTROLYTE MEMBRANE, FUEL CELL INCLUDING THE SAME, METHOD OF PREPARING THE CATALYST COATED ELECTROLYTE MEMBRANE

CROSS-REFERENCE TO RELATED PATENT APPLICATIONS

This application claims the benefit of Korean Application No. 2006-12030, filed Feb. 8, 2006, in the Korean Intellectual Property Office, the disclosure of which is incorporated herein by reference.

BACKGROUND OF THE INVENTION

1. Field of the Invention

Aspects of the present invention relate to a catalyst coated electrolyte membrane, a fuel cell including the same, and a method of preparing the catalyst coated electrolyte membrane, and more particularly, to a catalyst coated electrolyte membrane with improved performance and durability in which micro cracks of an electrode catalyst layer are minimized and thus the resistance between the electrode catalyst layer and an electrolyte membrane can be minimized, and crossover of a fuel to a cathode electrode is minimized, a fuel cell including the same, and a method of preparing the catalyst coated electrolyte membrane.

2. Description of the Related Art

Fuel cells are a type of a power generating system that directly converts a chemical energy of hydrogen contained in hydrocarbons, such as methanol, ethanol, and natural gas, and oxygen into an electrical energy.

A fuel cell system has a basic structure of a fuel cell stack, a fuel processor (FP), a fuel tank, a fuel pump etc. A fuel cell stack is a main body of a fuel cell, and is formed by stacking a few or tens of unit cells, each of which includes an electrolyte membrane electrode assembly (MEA) and a separator or bipolar plate.

An MEA includes an anode diffusion electrode, a cathode diffusion electrode, and a catalyst coated electrolyte membrane (CCM). In general, the CCM is prepared by respectively transferring a cathode catalyst layer and an anode catalyst layer to opposite surfaces of an electrolyte membrane.

In this transferring process, respective catalyst layers are formed by transferring a catalyst layer forming composition which is doped and dried on a polymer film, such as polyethyleneterephthalate (PET) or KAPTON, to an electrolyte membrane using a hot pressing process. The hot pressing process results in many micro cracks in the transferred catalyst layers because the electrolyte membrane and the catalyst layers are in different states before and after the transferring process.

Such micro cracks lead to high resistance between the catalyst layers and the electrolyte membrane and high crossover of methanol to the cathode electrode, thereby degrading the performance and long-term stability of the electrolyte membrane-electrode assembly.

SUMMARY OF THE INVENTION

Aspects of the present invention provide a catalyst coated electrolyte membrane with improved performance and durability in which micro cracks of an electrode catalyst layer are minimized and thus the resistance between the electrode catalyst layer and an electrolyte membrane can be minimized, and crossover of a fuel, such as methanol, ethanol, other alcohols, methane, etc., to a cathode electrode is minimized, a fuel cell including the same, and a method of preparing the catalyst coated electrolyte membrane.

According to an aspect of the present invention, there is provided a catalyst coated electrolyte membrane including an anode catalyst layer and a cathode catalyst layer at opposite sides thereof, respectively, wherein micro cracks of the anode catalyst layer occupy 0.01-1 area % of the entire anode catalyst layer and micro cracks of the cathode catalyst layer occupy 0.01-1% of the entire cathode catalyst layer.

According to another aspect of the present invention, there is provided a method of preparing a catalyst coated electrolyte membrane, the method including: preparing an anode catalyst layer transfer membrane by coating an anode catalyst layer forming composition on a support and then drying the coated composition; preparing a cathode catalyst layer transfer membrane by coating a cathode catalyst layer forming composition on a support and then drying the coated composition; pre-treating a $Na^+$-electrolyte membrane to obtain a $H^+$-electrolyte membrane; pre-heating the anode catalyst layer transfer membrane, the cathode catalyst layer transfer membrane, and the $H^+$-electrolyte membrane under an atmospheric pressure; and hot pressing the preheated anode catalyst layer transfer membrane, the preheated $H^+$-electrolyte membrane, and the preheated cathode catalyst layer transfer membrane sequentially deposited, so that the preheated anode catalyst layer and the preheated cathode catalyst layer are respectively transferred onto opposite surfaces of the $H^+$-electrolyte membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
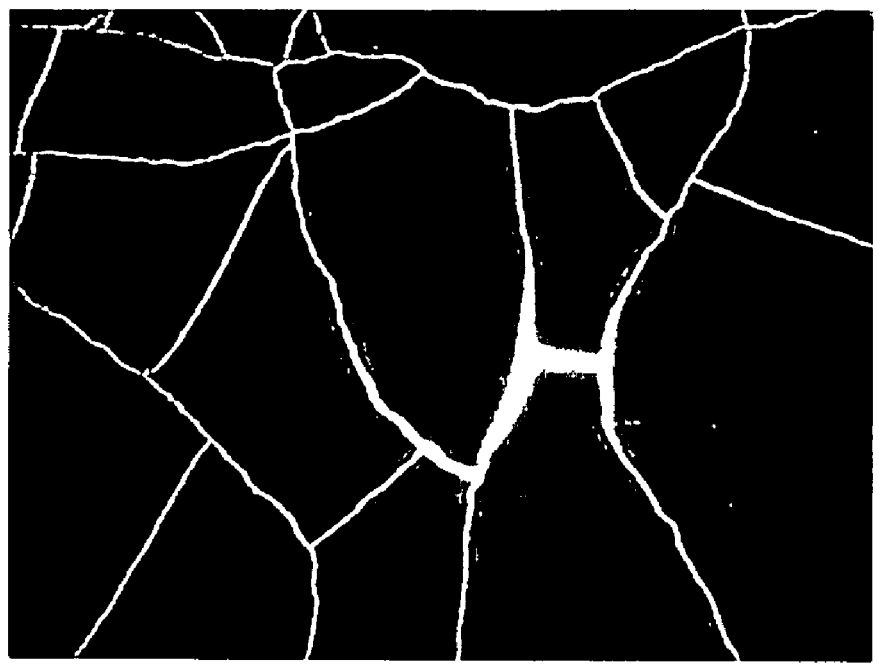
FIGS. 1A and 1B are surface images of a conventional catalyst coated electrolyte membrane.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to an embodiment of the present invention, in a catalyst coated electrolyte membrane including an anode catalyst layer and a cathode catalyst layer at opposite sides thereof, respectively, micro cracks of the anode catalyst layer and/or the cathode catalyst layer occupy 0.01-1 area % of the total area of the respective anode catalyst layer and/or cathode catalyst layer.

Figure 1B:
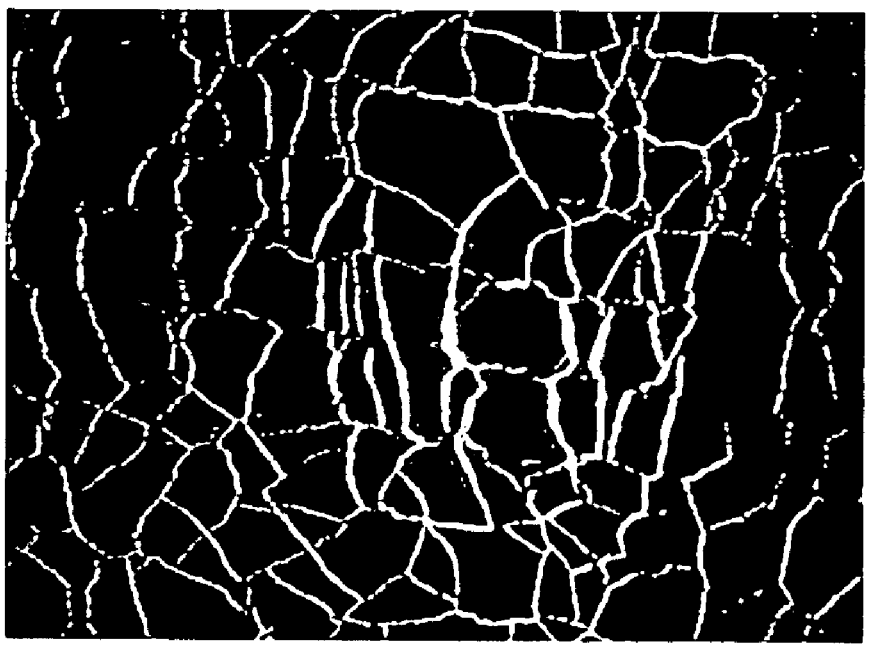

FIGS. 1A and 1B are images of a conventional catalyst coated electrolyte membrane. Referring to FIGS. 1A and 1B, the conventional catalyst coated electrolyte membrane includes many micro cracks in its surface generated due to sudden exposure to a high temperature and high pressure in a manufacturing process.

Figure 2:
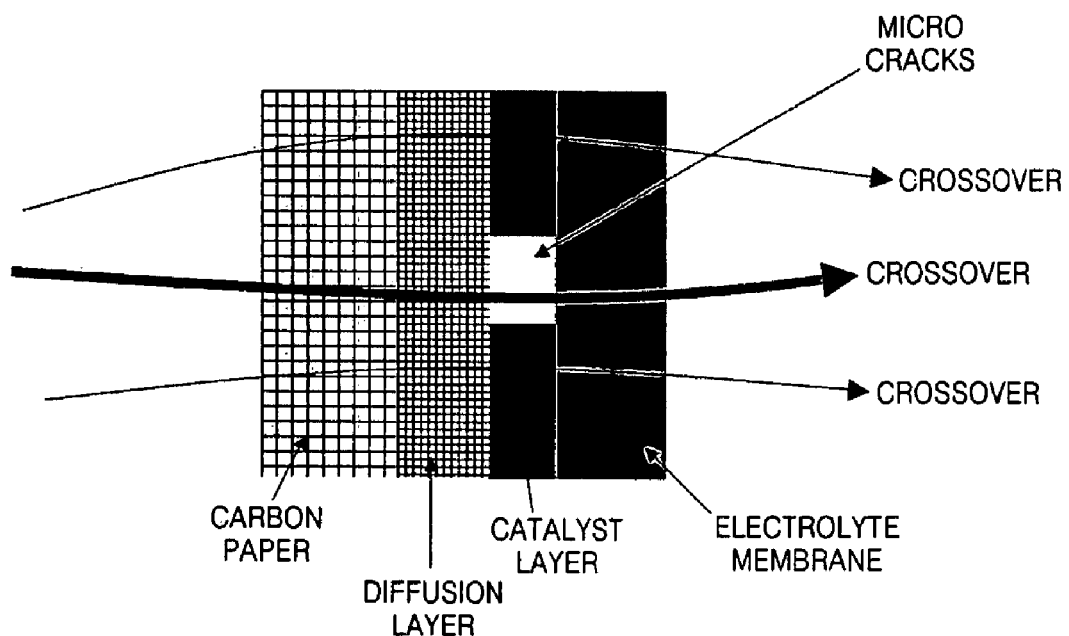
FIG. 2 schematically illustrates a possible fuel crossover resulting from micro cracks of a conventional catalyst coated electrolyte membrane.

FIG. 2 schematically illustrates a possible fuel crossover arising with micro cracks of a conventional catalyst coated electrolyte membrane. Referring to FIG. 2, the micro cracks reduce a catalyst reaction area and act as a path through which unreacted fuel, for example, methanol, can pass, thereby increasing crossover of the methanol fuel.

A catalyst coated electrolyte membrane according to an embodiment of the present invention reduces micro cracks sizes and frequency below that of a conventional catalyst coated electrolyte membrane.

The expression 'micro crack' in the present specification refers to a crack formed on one or more electrode catalyst layers forming surfaces of a catalyst coated electrolyte membrane and through which an electrolyte membrane is exposed. In general, a conventional catalyst coated electrolyte membrane has micro cracks having an average width of 0.1-1 μm and an average length of 10 μm. In order to clarify that the catalyst coated electrolyte membrane according to an embodiment of the present invention has significantly fewer and smaller micro cracks than a conventional catalyst coated electrolyte membrane, the proportion of micro cracks is measured as a percentage of the total area of the electrode catalyst layer. In a catalyst coated electrolyte membrane according to an embodiment of the present invention, micro cracks in one or more of the electrode catalyst layers occupy 0.01-1% of the total area of the respective electrode (anode or cathode) catalyst layer. On the other hand, in a conventional catalyst coated membrane, micro cracks of one of the electrode catalyst layers occupy 1-10% of the total area of the respective electrode catalyst layer.

Figure 3A:
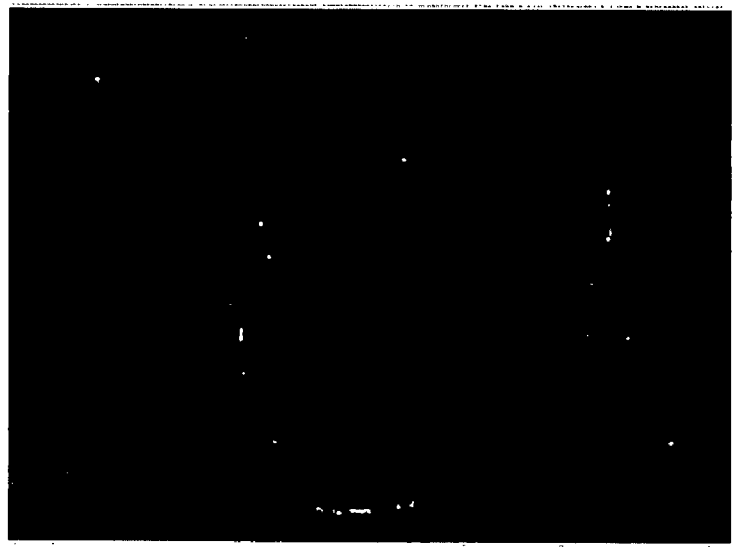
FIGS. 3A and 3B are surface images of catalyst coated electrolyte membranes prepared according to Example 1 and Example 2, respectively.
Figure 3B:

FIGS. 3A and 3B are images of a catalyst coated electrolyte membrane according to an embodiment of the present invention. Referring to FIGS. 3A and 3B, the catalyst coated electrolyte membrane according to an embodiment of the present invention has significantly fewer and smaller micro cracks than a conventional catalyst coated electrolyte membrane (see FIGS. 1A and 1B).

A fuel cell according to an embodiment of the present invention includes the catalyst coated electrolyte membrane described above.

While not required in all aspects, the fuel cell has a stack structure of a plurality of unit cells, each of which includes an electrolyte membrane electrode assembly (MEA) including the catalyst coated electrolyte membrane described above, an anode diffusion electrode, and a cathode diffusion electrode, and a separator. Furthermore, a fuel processor (FP), a fuel tank, and a fuel pump can be used together with the fuel cell to form a fuel cell system.

A method of preparing a catalyst coated electrolyte membrane according to an embodiment of the present invention includes: preparing an anode catalyst layer transfer membrane by coating an anode catalyst layer forming composition on a support and then drying the coated composition; preparing a cathode catalyst layer transfer membrane by coating a cathode catalyst layer forming composition on a support and then drying the coated composition; pre-treating a $Na^+$-electrolyte membrane to prepare a $H^+$-electrolyte membrane; pre-heating the anode catalyst layer transfer membrane, the cathode catalyst layer transfer membrane, and the $H^+$-electrolyte membrane under an atmospheric pressure; and sequentially stacking and hot pressing the preheated anode catalyst layer transfer membrane, the preheated $H^+$-electrolyte membrane, and the preheated cathode catalyst layer transfer membrane to transfer the preheated anode catalyst layer and the preheated cathode catalyst layer to the $H^+$-electrolyte membrane. Although the stacking and hot pressing is referred to as sequential, it is understood that the stacking in the reverse sequence is also an aspect of the present invention.

Figure 4:
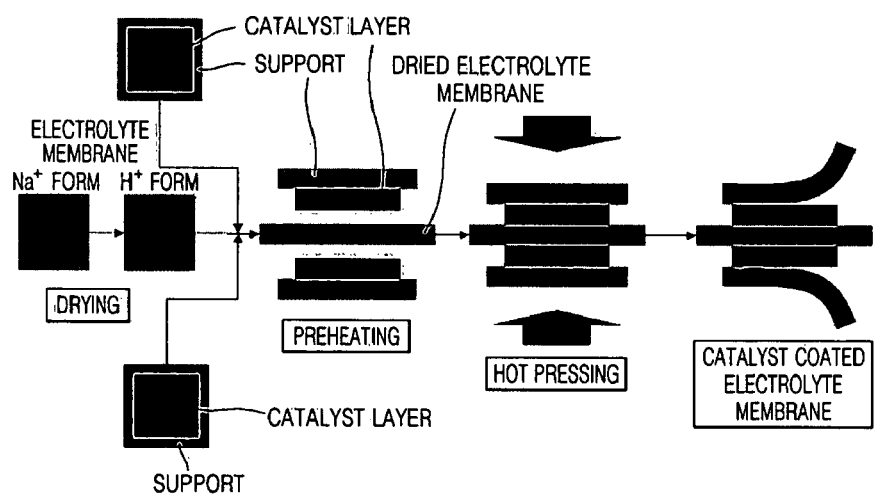
FIG. 4 schematically illustrates a method of preparing a catalyst coated electrolyte membrane according to an embodiment of the present invention.

FIG. 4 schematically illustrates a method of preparing a catalyst coated electrolyte membrane according to an embodiment of the present invention.

In the method, a catalyst, a solvent, and a binder are mixed to prepare a catalyst layer forming composition. The prepared composition is coated on a first support and then dried to prepare an anode catalyst layer transfer membrane.

While not required in all aspects, the first support can be a film of a polymer material, such as polyethyleneterephthalate (PET) or KAPTON. The binder may be a proton conductive resin, for example, a fluorine resin having a water repellent property. The fluorine resin can be a material having a melting point of 400° C. or less, such as NAFION, polytetrafluoroethylene, a tetrafluoroethylene-perfluoro alkylvinyl ether copolymer, or the like. The amount of the binder may be in the range of 10-40 parts by weight based on 100 parts by weight of the catalyst.

The catalyst may be, but is not limited to, Pt, Ru, Pd, Rh, Ir, Os, Ni, a mixture thereof, an alloy thereof, or a supported catalyst thereof, with a catalyst dispersed in carbon black, such as carbon black, acetylene black, activated carbon, or graphite, for example, PtRu/C.

While not required in all aspects, the solvent may be water or an alcohol, such as 1-propanol, ethyleneglycol, and 2-propanol. The amount of the solvent may be in the range of 5-250 parts by weight based on 100 parts by weight of the catalyst. Particularly, when the solvent is water, the amount of water may be in the range of 5-10 parts by weight. When the solvent is 1-propanol, the amount of the 1-propanol may be in the range of 150-250 parts by weight. When the solvent is ethylene glycol, the amount of ethylene glycol may be in the range of 100-200 parts by weight. When the solvent is 2-propanol, the amount of 2-propanol may be in the range of 150-250 parts by weight.

A catalyst, a solvent and a binder are mixed to prepare a cathode catalyst layer forming composition. In this case, the same or similar kinds of the binder and the solvent as used for the anode catalyst layer forming composition can be used in the same or similar amounts. The cathode catalyst layer forming composition is coated on a second support to obtain a cathode catalyst layer on the second support. The second support is the same as or similar to the first support described above.

Meanwhile, a $Na^+$-electrolyte membrane is pretreated to form an $H^+$-electrolyte membrane. In general, the $Na^+$-electrolyte membrane can be a cation exchange polymer electrolyte, such as a sulfonated perfluoropolymer having a main chain of alkylene fluoride and a side chain of vinyl ether fluoride terminated with a sulfonic acid (for example, NAFION produced by Dupont Co.).

The Na$^+$-electrolyte membrane is pretreated to obtain the H$^+$-electrolyte membrane as follows. The pretreatment process is performed by sequentially immersing the Na$^+$-electrolyte membrane in an H$_2$O$_2$ solution, an H$_2$SO$_4$ solution, and a deionized water, and then drying the immersed result.

The concentration of the H$_2$O$_2$ solution may be in the range of 5-15%, and the mol number of H$_2$SO$_4$ in the H$_2$SO$_4$ solution is in the range of 0.5-2 mol.

The Na$^+$-electrolyte membrane may be immersed in the H$_2$O$_2$ solution for 1 hour-1.5 hours, the H$_2$SO$_4$ solution for 0.5 hours-1.5 hours, and then in the deionized water for 1 hour-2 hours.

Figure 5:
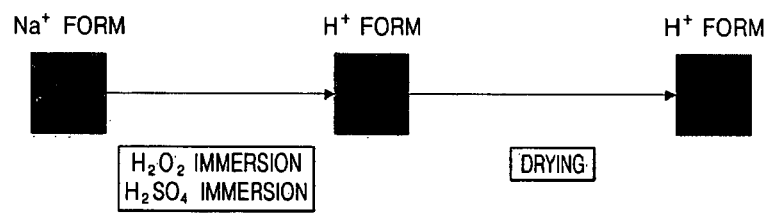
FIG. 5 schematically illustrates a pretreatment process of an electrolyte membrane in the method illustrated in FIG. 4.

After the H$^+$-electrolyte membrane is obtained by the immersion, the H$^+$-electrolyte membrane is dried at 50° C.-70° C. for 30 minutes-1 hour. The drying process prevents the electrolyte membrane from shrinking or bending during the preparation of a catalyst coated electrolyte membrane. FIG. 5 schematically illustrates the pretreatment process of the electrolyte membrane.

Subsequently, the anode catalyst layer transfer membrane, the cathode catalyst layer transfer membrane, and the electrolyte membrane are pre-heated under an atmospheric pressure. This preheating process in which the temperatures of the anode catalyst layer transfer membrane, the cathode catalyst layer transfer membrane, and the electrolyte membrane are raised to be the same as the temperature of a hot pressing process before the anode catalyst layer and the cathode catalyst layer are transferred to the electrolyte membrane by the hot pressing process contributes to preventing formation of micro cracks in the anode catalyst layer and the cathode catalyst layer and increases transfer efficiency. Aspects of the present invention have advantages, in that the preheating process is performed under an atmospheric pressure without increases in temperature and pressure, while not limited thereto.

The preheating to the temperature of the hot pressing process may be performed at 100° C.-140° C. for 2-10 minutes. Generally, when the preheating is performed at lower than 100° C. or for shorter than 2 minutes, the heat is insufficiently transferred to the electrolyte membrane and thus it is difficult to combine the electrolyte membrane with the catalyst layers, thereby increasing an interface resistance. On the other hand, when the preheating is performed at higher than 140° C. or longer than 10 minutes, generally, the temperature of the electrolyte membrane is higher than a glass transition temperature (Tg) thereof, and thus, a polymer structure of the electrolyte membrane decomposes.

Once preheated, the anode catalyst layer transfer membrane, the electrolyte membrane, and the cathode catalyst layer transfer membrane are sequentially deposited, such that the electrolyte membrane is between the anode catalyst layer and the cathode catalyst layer, and then the anode catalyst layer and the cathode catalyst layer are respectively transferred to the electrolyte membrane by the hot pressing process. As a result, a catalyst coated electrolyte membrane according to an embodiment of the present invention is prepared.

The hot pressing process may be performed at 100° C.-140° C. at a pressure of 0.1~1.5 tons/in$^2$, preferably 0.1~1.0 tons/in$^2$, for 5-10 minutes.

While not required in all aspects, the catalyst coated electrolyte membrane prepared as described above is interposed between an anode diffusion electrode and a cathode diffusion electrode, each of which is prepared by spraying ink in which a fluorine based resin-containing emulsion, such as polytetrafluoroethylene (PTFE), is uniformly dispersed in carbon black, and then the resultant structure is hot pressed to form a membrane electrode assembly.

Aspects of the present invention will be described in further detail with reference to the following examples. These examples are for illustrative purposes only and are not intended to limit the scope of the present invention.

Example 1

A Pt—Ru alloy as an anode metal catalyst was dispersed in a mixture of ultrapure distilled water, ethylene glycol, and 20 wt % NAFION ionomer solution (produced by Dupont Co.) to prepare a slurry. The prepared slurry was coated on a 50 µm-thick KAPTON film and then dried to prepare an anode catalyst layer transfer membrane. An anode catalyst layer was formed such that the concentration of the catalyst was 6 mg/cm$^2$ based on the amount of the Pt—Ru alloy.

Pt as a cathode metal catalyst was dispersed in a mixture of ultrapure distilled water, ethylene glycol, and 20 wt % NAFION ionomer solution (produced by DUPONT CO.) to prepare a slurry. The prepared slurry was coated on a 50 µm-thick KAPTON film and then dried to prepare a cathode catalyst layer transfer membrane. A cathode catalyst layer was formed such that the concentration of the catalyst was 2 mg/cm$^2$ based on the amount of Pt.

A NAFION (produced by DUPONT CO.) membrane having a thickness of 120 µm was used as an electrolyte membrane. The NAFION membrane was immersed in 1 L of 10% H$_2$O$_2$ solution for 1 hour, immersed in 1 L of 1 M H$_2$SO$_4$ solution for 1 hour, and then immersed in a deionized water for one hour, thereby obtaining an H$^+$-electrolyte membrane. The H$^+$-electrolyte membrane was dried at 60° C. for 1 hour.

The anode catalyst layer transfer membrane, the cathode catalyst layer transfer membrane, and the electrolyte membrane were preheated at 130° C. for 3 minutes.

The preheated anode catalyst layer transfer membrane, the preheated cathode catalyst layer transfer membrane, and the preheated electrolyte membrane were hot pressed at 130° C. in a pressure of 1.5 tons/in$^2$ for 6 minutes, thereby obtaining a catalyst coated electrolyte membrane that includes an anode catalyst layer and a cathode catalyst layer at opposite sides thereof, respectively. The surface image of the prepared catalyst coated electrolyte membrane is shown in FIG. 3A.

Example 2

A catalyst coated electrolyte membrane was prepared in the same manner as in Example 1, except that the anode catalyst layer transfer membrane, the cathode catalyst layer transfer membrane, and the electrolyte membrane were preheated for 6 minutes. The surface image of the prepared catalyst coated electrolyte membrane is shown in FIG. 3B.

Comparative Example

A catalyst coated electrolyte membrane was prepared in the same manner as in Example 1, except that the anode catalyst layer transfer membrane, the cathode catalyst layer transfer membrane, and the electrolyte membrane were not preheated. The surface images of the prepared catalyst coated electrolyte membrane are shown in FIGS. 1A and 1B.

Figure 6:
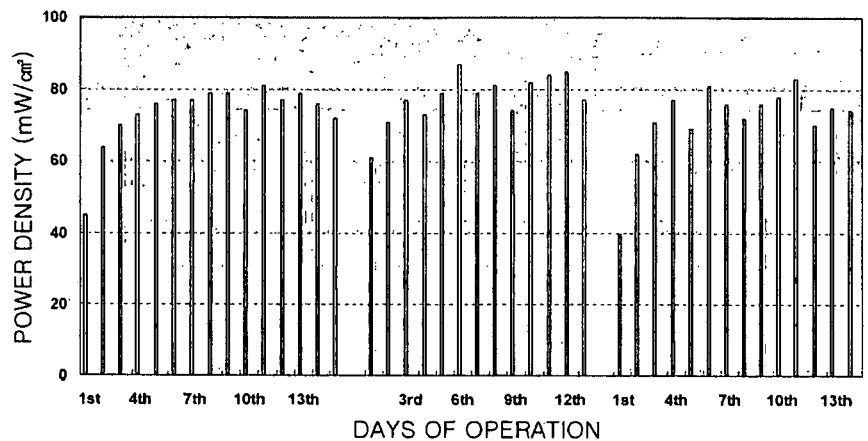
FIG. 6 is a graph showing performance and durability on days of operation of a fuel cell including the catalyst coated electrolyte membrane prepared according to Example 1.
Figure 7:
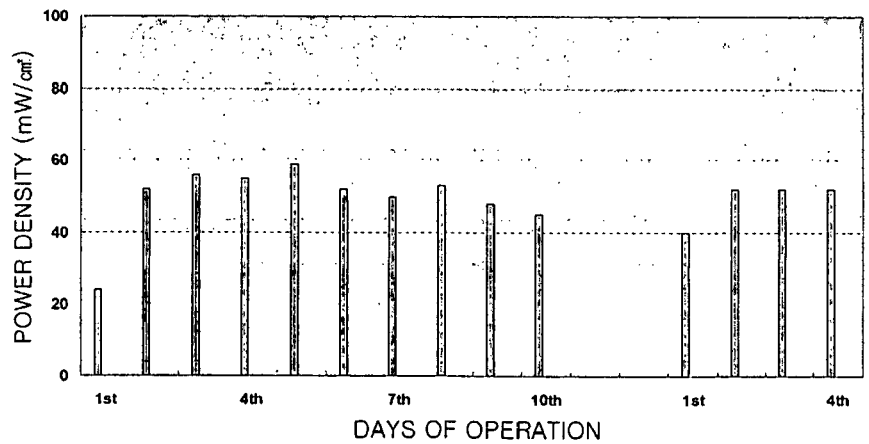
FIG. 7 is a graph showing performance and durability on days of operation of a fuel cell including a catalyst coated electrolyte membrane prepared according to Comparative Example.

FIG. 6 is a graph showing performance and durability on days of operation of a fuel cell including the catalyst coated electrolyte membrane prepared according to Example 1. FIG. 7 is a graph showing performance and durability on days of operation of a fuel cell including the catalyst coated electrolyte membrane prepared according to Comparative Example.

In a process of manufacturing a fuel cell, an anode diffusion electrode and a cathode diffusion electrode prepared by spraying ink containing a dispersion of polytetrafluoroethylene (PTFE) in carbon black on 350 μm-thick carbon papers were used as diffusion electrodes.

Referring to FIGS. 6 and 7, a fuel cell including the catalyst coated electrolyte membrane prepared according to Example 1 showed higher power density at the same voltage than a fuel cell including the catalyst coated electrolyte membrane prepared according to Comparative Example. In addition, even after operation for a long time, the power density was not significantly decreased.

According to aspects of the present invention, micro cracks of the electrode catalyst layer of the catalyst coated electrolyte membrane can be minimized, and thus the resistance between the electrode catalyst layer and the catalyst coated electrolyte membrane can be minimized, and crossover of a fuel, such as methanol, ethanol, other alcohols, methane, etc., to the cathode electrode can be minimized. Accordingly, the performance and durability of the catalyst coated electrolyte membrane can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A catalyst coated electrolyte membrane comprising an anode catalyst layer and a cathode catalyst layer in a hot pressed condition on an electrolyte membrane at opposite sides thereof, respectively, wherein:
   the electrolyte membrane is an $H^+$-electrolyte membrane, and
   micro cracks of the anode catalyst layer or cathode catalyst layer in the hot pressed condition on electrolyte membrane occupy 0.01-1 area % of the total area of the respective anode catalyst layer or cathode catalyst layer.

2. A fuel cell including the catalyst coated electrolyte membrane of claim 1.

3. The fuel cell of claim 2, wherein a fuel of the fuel cell is methanol, ethanol, or a combination thereof.

4. The fuel cell of claim 2, further comprising:
   a stack structure comprising:
      a plurality of unit cells, wherein each unit cell includes the catalyst coated electrolyte membrane of claim 1, an anode diffusion electrode, a cathode diffusion electrode, and a separator.

5. A fuel cell system, comprising:
   the fuel cell of claim 4;
   a fuel processor;
   a fuel tank; and
   a fuel pump.

6. The catalyst coated electrolyte membrane as claimed in claim 1, wherein the $H^+$-electrolyte membrane is an $H^+$ sulfonated perfluoropolymer.

7. A method of preparing a catalyst coated electrolyte membrane, the method comprising:
   preparing an anode catalyst layer transfer membrane by coating an anode catalyst layer forming composition on a support and then drying the coated composition;
   preparing a cathode catalyst layer transfer membrane by coating a cathode catalyst layer forming composition on a support and then drying the coated composition;
   pre-treating a $Na^+$-electrolyte membrane to obtain an $H^+$-electrolyte membrane;
   pre-heating the anode catalyst layer transfer membrane, the cathode catalyst layer transfer membrane, and the $H^+$-electrolyte membrane under an atmospheric pressure; and
   sequentially stacking and hot pressing the preheated anode catalyst layer transfer membrane, the preheated $H^+$-electrolyte membrane, and the preheated cathode catalyst layer transfer membrane to respectively transfer the preheated anode catalyst layer and the preheated cathode catalyst layer to opposite surfaces of the $H^+$-electrolyte membrane such that a catalyst coated electrolyte membrane including an anode catalyst layer and a cathode catalyst layer in a hot pressed condition at opposite sides thereof, respectively, is formed, wherein micro cracks of the anode catalyst layer or cathode catalyst layer in the hot pressed condition in the catalyst coated electrolyte membrane occupy 0.01-1 area % of the total area of the respective anode catalyst layer or cathode catalyst layer.

8. The method of claim 7, wherein, in the pre-treating, the $H^+$-electrolyte membrane is sequentially immersed in an $H_2O_2$ solution, in an $H_2SO_4$ solution, then in deionized water, and then dried.

9. The method of claim 8, wherein the concentration of the $H_2O_2$ solution is in a range of 5-15%, and the mol number of the $H_2SO_4$ solution is in a range of 0.5-2 mol.

10. The method of claim 8, wherein the $H^+$-electrolyte membrane is immersed in the $H_2O_2$ solution for 1-1.5 hours, in the $H_2SO_4$ solution for 0.5-1.5 hours, and then in the deionized water for 1-2 hours.

11. The method of claim 8, wherein the drying is performed at 50° C.-70° C. for 30 minutes-1 hour.

12. The method of claim 7, wherein the preheating is performed at 100° C.-140° C. for 2-10 minutes.

13. The method of claim 7, wherein the hot pressing is performed at 100° C.-140° C. and a pressure of 0.1~1.5 tons/$in^2$ for 5-10 minutes.

14. The method of claim 7, wherein the hot pressing is performed at 100° C.-140° C. and a pressure of 0.1~1.0 tons/$in^2$ for 5-10 minutes.

15. A method of preparing a catalyst coated electrolyte membrane, comprising:
   preheating one or more electrode catalyst layer transfer membranes and an $H^+$-electrolyte membrane under an atmospheric pressure;
   layering the preheated $H^+$-electrolyte membrane with the one or more preheated electrode catalyst layer transfer membranes, wherein one or more electrode catalyst layers of the respective electrode catalyst layer transfer membranes contact the $H^+$-electrolyte membrane; and
   hot pressing the layered membranes to transfer the one or more electrode catalyst layers to the $H^+$-electrolyte membrane, such that a catalyst coated electrolyte membrane including one or more electrode catalyst layers in a hot pressed condition is formed, wherein micro cracks of the one of the one or more electrode catalyst layers in the hot pressed condition in the catalyst coated electrolyte membrane occupy 0.01-1 area % of the total area of the one of the one or more electrode catalyst layers.

16. The method of claim 15, wherein one electrode catalyst layer is transferred to each surface of the $H^+$-electrolyte membrane.

17. The method of claim 15, wherein the preheating of one or more electrode catalyst layer transfer membranes comprises:

preparing the electrode catalyst layer transfer membrane by coating an electrode catalyst layer forming composition on a support and then drying the coated composition.

18. The method of claim 15, wherein the preheating of the H$^+$-electrolyte membrane comprises:
pre-treating a Na$^+$-electrolyte membrane to obtain an H$^+$-electrolyte membrane by sequentially immersing the Na$^+$-electrolyte membrane in an H$_2$O$_2$ solution, in an H$_2$SO$_4$ solution, then in deionized water, and then dried.

19. The method of claim 17, wherein the preparing of the electrode catalyst layer transfer membrane comprises:
mixing a catalyst, a solvent, and a binder to prepare the electrode catalyst layer forming composition.

20. The method of claim 19, wherein the preparing of the electrode catalyst layer transfer membrane further comprises:
preparing a film of one of polyethyleneterephthalate or KAPTON as the support;
using a proton conductive resin as the binder; and
preparing the catalyst using one of, Pt, Ru, Pd, Rh, Ir, Os, Ni, a mixture thereof, an alloy thereof, or a supported catalyst thereof, wherein a catalyst support is one of, carbon black, acetylene black, activated carbon, or graphite.

21. The method of claim 19, wherein the solvent is one of water, alcohol or a combination thereof.

22. The method of claim 21, wherein the solvent is one of water, 1-propanol, ethylene glycol, 2-propanol, or a combination thereof, wherein an amount of the solvent is in a range of 5-250 parts by weight based on 100 parts by weight of the catalyst.

23. The method of claim 22, wherein
when the solvent is water, the amount of water is in a range of 5-10 parts by weight based on 100 parts by weight of the catalyst;
when the solvent is 1-propanol, the amount of the 1-propanol is in a range of 150-250 parts by weight based on 100 parts by weight of the catalyst;
when the solvent is ethylene glycol, the amount of ethylene glycol is in a range of 100-200 parts by weight based on 100 parts by weight of the catalyst;
when the solvent is 2-propanol, the amount of 2-propanol is in a range of 150-250 parts by weight based on 100 parts by weight of the catalyst.

24. A catalyst coated electrolyte membrane comprising a first electrode catalyst layer in a hot pressed condition on a first side of an electrolyte membrane, wherein:
the electrolyte membrane is an H$^+$-electrolyte membrane, and
micro cracks of the first electrode catalyst layer in the hot pressed condition on the electrolyte membrane occupy 0.01-1 area % of the total area of the first electrode catalyst layer.

25. The catalyst coated electrolyte membrane of claim 24, further comprising a second electrode catalyst layer in a hot pressed condition on a second side of the catalyst coated electrolyte membrane, wherein micro cracks of the second electrode catalyst in the hot pressed condition on the electrolyte membrane layer occupy 0.01-1 area % of the total area of the second electrode catalyst layer.

26. The catalyst coated electrolyte membrane of claim 24, wherein the first electrode catalyst layer includes:
a catalyst of one of Pt, Ru, Pd, Rh, Ir, Os, Ni, a mixture thereof, an alloy thereof, or a supported catalyst thereof, wherein a catalyst support of the supported catalyst is one of carbon black, acetylene black, activated carbon, graphite, or a combination thereof.

27. A fuel cell including the catalyst coated electrolyte membrane of claim 24.

28. The fuel cell of claim 27, wherein a fuel of the fuel cell is one of methanol, ethanol, or a combination thereof.

29. The fuel cell of claim 27, further comprising:
a stack structure comprising:
a plurality of unit cells, wherein each unit cell includes the catalyst coated electrolyte membrane of claim 1, an anode diffusion electrode, a cathode diffusion electrode, and a separator.

30. A fuel cell system, comprising:
the fuel cell of claim 29;
a fuel processor;
a fuel tank; and
a fuel pump.

31. The catalyst coated electrolyte membrane as claimed in claim 24, wherein the H$^+$-electrolyte membrane is an H$^+$ sulfonated perfluoropolymer.

* * * * *